United States Patent [19]
Whitehurst et al.

[11] 3,866,580
[45] Feb. 18, 1975

[54] AIR-COOLED ENCLOSURE FOR AN ENGINE

[75] Inventors: Gerald E. Whitehurst, East Peoria; Eldon D. Oestmann, Washington, both of Ill.

[73] Assignee: Caterpillar Tractor Company, Peoria, Ill.

[22] Filed: Nov. 5, 1973

[21] Appl. No.: 412,913

[52] U.S. Cl................ 123/41.7, 55/431, 123/41.64, 165/51, 180/54 A
[51] Int. Cl.............................................. F01p 1/02
[58] Field of Search ...... 123/41.7, 41.64; 180/54 A, 180/68 R; 55/431, 468; 165/51

[56] References Cited
UNITED STATES PATENTS

| | | | |
|---|---|---|---|
| 2,138,001 | 11/1938 | Fluor | 180/54 A |
| 2,207,447 | 7/1940 | Viles | 123/41.64 |
| 2,242,494 | 5/1941 | Wolf | 180/54 A |
| 3,104,962 | 9/1963 | Duer | 55/431 |
| 3,137,553 | 6/1964 | Billey | 55/431 |
| 3,630,003 | 12/1971 | Ashton | 180/68 R |

FOREIGN PATENTS OR APPLICATIONS

| | | | |
|---|---|---|---|
| 887,262 | 8/1943 | France | 180/54 A |
| 881,310 | 7/1949 | Germany | 180/54 A |

*Primary Examiner*—Manuel A. Antonakas
*Assistant Examiner*—Daniel J. O'Connor
*Attorney, Agent, or Firm*—Caterpillar Tractor Co.

[57] ABSTRACT

An air-cooled enclosure for an engine, fan and heat exchanger installation with the engine including an exhaust pipe extending outwardly through the enclosure. An engine compartment within the enclosure has an air inlet and an air outlet and an ejector utilizing the flow of engine exhaust gas from the exhaust pipe to create a low pressure within the air outlet in order to draw ambient cooling air through the air inlet into the engine compartment and out of the air outlet with a minimum of noise transmission through the enclosure. The enclosure further includes a separate engine heat exchanger and fan compartment providing a separate air inlet passage and a separate air outlet passage wherein the powered fan draws ambient cooling air into the separate air inlet and forces it through the heat exchanger and out of the separate air outlet at a minimum noise level and with optimum engine cooling effectiveness.

8 Claims, 5 Drawing Figures

42, a rear mounted multispeed transmission 43, and a pinion and bevel gear cross drive arrangement 44 to powerably rotate the sprockets 14 on opposite sides of the tractor. The pinion and bevel gear cross drive arrangement 44 is generally disposed within a cylindrical tube 45 arranged in transverse bracing relation between the sidewalls 33. Reference is made to Application Ser. No. 338,314 filed on Mar. 5, 1973, to R. L. Krolak, et al., and assigned to the same assignee of the present invention with respect to details of construction of the tractor and such cross tube.

The engine 39 includes a dual air intake system 46 with the engine inlet openings 24 communicating with a transversely disposed air intake plenum 47 supported beneath the tractor hood 23. A pair of laterally spaced air intake pipes 48 open into the plenum and extend downwardly to allow air to be directed to a corresponding pair of engine air precleaners 49 and engine air filters 50 respectively. The clean inlet air then passes through a pair of inwardly and upwardly curved intake ducts 51 and is directed to a pair of laterally spaced turbochargers 52 and to the engine 39. Engine exhaust, on the other hand, is directed to the turbochargers from the engine to permit compression of the engine intake air in the usual manner, and is then collected through a centrally arranged and upwardly curved exhaust duct 53 and directed into a noise reducing muffler 54. From the muffler, exhaust passes upwardly and outwardly through a generally tubular exhaust pipe 55.

As shown in greater detail in FIG. 3, the tubular exhaust pipe 55 extends concentrically upwardly within a tubular stack 56 which is supported by the tractor hood 23 in register with an air outlet passage 57 in the hood. The exhaust pipe is preferably a venturi shape providing a throat 58 and an outlet 59 therein. The concentric disposition of the exhaust pipe 55 within the tubular stack 56 results in an ejector action therebetween which utilizes the flow of engine exhaust gases upwardly from the outlet 59 to create a low pressure within the air outlet passage 57 and to thereby induce the flow of cooling air through the tractor hood. Further, a dust ejection conduit 60 communicates with both of the engine precleaners 49 through a pair of branch conduits 61 and 62 and terminates concentrically within the venturi throat 58 to permit dust to be similarly drawn from the precleaners, through the conduits, and to be directed centrally outwardly and upwardly from the exhaust pipe and stack. In this regard, reference is made to U.S. Pat. No. 3,137,553 to L. H. Billey, which discloses an aspirating system to remove dust from an air cleaner.

An air-cooled engine heat exchanger 65 through which water or the like is circulated for cooling of the engine 39 is mounted in a generally upright position rearwardly and centrally within the radiator guard 26. A second heat exchanger 66 through which oil or the like is circulated is disposed forwardly thereof in a similar manner. An engine driven fan 67 is disposed between the heat exchangers for the circulation of cooling air therethrough.

More particularly, the air-cooled enclosure 10 of the present invention includes an upright barrier wall identified generally by the reference numeral 70 which divides the enclosure into a substantially enclosed engine compartment 72 disposed in the central portion 18 and the rearward portion 19 of the tractor 11 and a separate engine heat exchanger and fan compartment 74 disposed in the forward portion 17. The engine compartment 72 is substantially closed except for the relatively small air outlet passage 57 and the relatively remotely rearwardly spaced, but relatively large air inlet passage 34 circuitously disposed about the multispeed transmission 43. On the other hand, the heat exchanger and fan compartment 74 is generally more open including the separate air inlet passages 25 and 38 in the engine hood 23 and the louvered access panels 37 respectively to permit ingress of ambient air, and the separate air outlet passages 30 to permit egress of the air. The upright barrier wall 70 is formed by a plurality of joined inwardly converging panels 76 that abut the laterally spaced sidewalls 35 rearwardly of the louvered access panels 37 to allow better impingement of the air on the heat exchangers 65 and 66.

Alternate Embodiment

An alternate embodiment of the ejector portion of the present invention is shown in FIG. 4, wherein the extremity of the tubular exhaust pipe 55 is frusto-conical to form a constricted nozzle 81. The nozzle extends concentrically within a corresponding frusto-conical converging entrance 82 formed intermediate the tubular stack 56 and an initially enlarged tubular entry portion 83 thereof to effectively utilize and increase the velocity of the exhaust gases emanating from the exhaust pipe to draw air into the engine compartment 72 through an ejector action.

Second Alternate Embodiment

A second alternate embodiment of the ejector portion of the present invention is shown in FIG. 5, wherein the tubular stack 56 includes an elongated frusto-conical converging entrance 84 which is directly associated with the air outlet passage 57. In this embodiment a straight tubular exhaust pipe 55 terminates at an end surface 85 disposed substantially within the entrance 84 to effect a simplified ejector action without departing from the spirit of the present invention.

Operation

While the operation of the present invention is clearly apparent from the foregoing description, further amplification will subsequently be made in the following brief summary of such operation. With reference to FIGS. 1, 2, and 3, operation of the engine 39 directs engine exhaust gases at a relatively high velocity upwardly and outwardly from the exhaust pipe 55. As a result of the venturi action within the stack 56, a relatively low pressure is created within the air outlet passage 57, and generally exteriorly of the exhaust pipe 55 to draw ambient cooling air over the power train 40 and the engine 39 with the assistance of atmospheric pressure at the air inlet passage 34, as shown by the dark arrows indicated by the reference letter A. The relatively remotely spaced disposition of the air inlet passage 34 from the engine allows air to be drawn forwardly between the ceiling 21, the floor 32, and the sidewalls 33 to generally cool the underside of the operator station 20. Since the air inlet passage 34 is so rearwardly disposed with respect to the engine and noise-containing barrier wall 70, acoustical treatment interiorly of the engine compartment 72 coupled with the general disposition of the power train 40, the cylindrical tube 45 and associated components suffice to

AIR-COOLED ENCLOSURE FOR AN ENGINE

BACKGROUND OF THE INVENTION

In order to meet increasingly more stringent governmental and user requirements in regard to power plant noise levels, efforts are being made to reduce noise such as by boxing in the power plant and treating the walls with acoustical material or the like. While an enclosure of this type substantially reduces the noise emanating from the power plant or engine and associated cooling fan, it usually results in entrapment of hot air within the enclosure and necessitates a sophisticated air circulating system to permit normal operation of the engine. Simply supplying a larger fan or increasing its speed is self defeating from the standpoint that the fan itself is a major source or irritating noise and a subservient user of considerable power. Also, with the fan and engine juxtaposed with a heat exchanger, the air drawn over the exterior surfaces of the engine is unfortunately heated prior to its being directed through the engine heat exchanger which lowers the overall effectiveness of the heat transfer operation. A further disadvantage of such arrangement is that the fan draws oily fumes from the engine surfaces and impinges them against the surfaces of the heat exchanger, which causes coating and a further reduction in the efficiency thereof.

Use of separate cooling fans for the air circulation and the heat exchanger functions within an enclosed power plant is, of course, possible. However, the space within an acoustically treated enclosure is already limited due to economic considerations, and use of two or more fans gives rise to component placement and serviceability problems and the additional complexity and cost of providing separate drive mechanisms for powering the additional fans. Consequently, these interrelated problems continue to present a significant challenge to improve the working environment and overall efficiency of the usual power plant at a minimum cost.

Illustrative of the wide range of efforts to solve such problems is the technical report No. 26 by Messrs. A. L. London and P. F. Pucci of the Department of Mechanical Engineering of Stanford University in July, 1955, entitled "Exhaust-Stack Ejectors For Marine Gas Turbine Installations" and U.S. Pat. No. 3,043,390 J. B. Lattay. Neither of these references completely solve the aforementioned problems.

SUMMARY AND OBJECTS OF THE INVENTION

It is therefore an object of the present invention to provide an improved air-cooled enclosure for an engine.

Another object of the invention is to provide such an improved air-cooled enclosure particularly for use on a vehicle wherein the deleterious influence of noise and hot air upon the operator is minimized.

Another object of the invention is to provide an air-cooled enclosure which requires only a minimum number of fans to reduce costs and provide greater flexibility and most efficient use of space within the enclosure.

Another object of the invention is to provide such an air-cooled enclosure which is better able to maintain an engine heat exchanger substantially free of any accumulation of extraneous matter for improved overall heat transfer purposes.

Other objects and advantages of the present invention will become more readily apparent upon reference to the accompanying drawings and the following description.

DESCRIPTION OF PREFERRED EMBODIMENT

Figure 1:
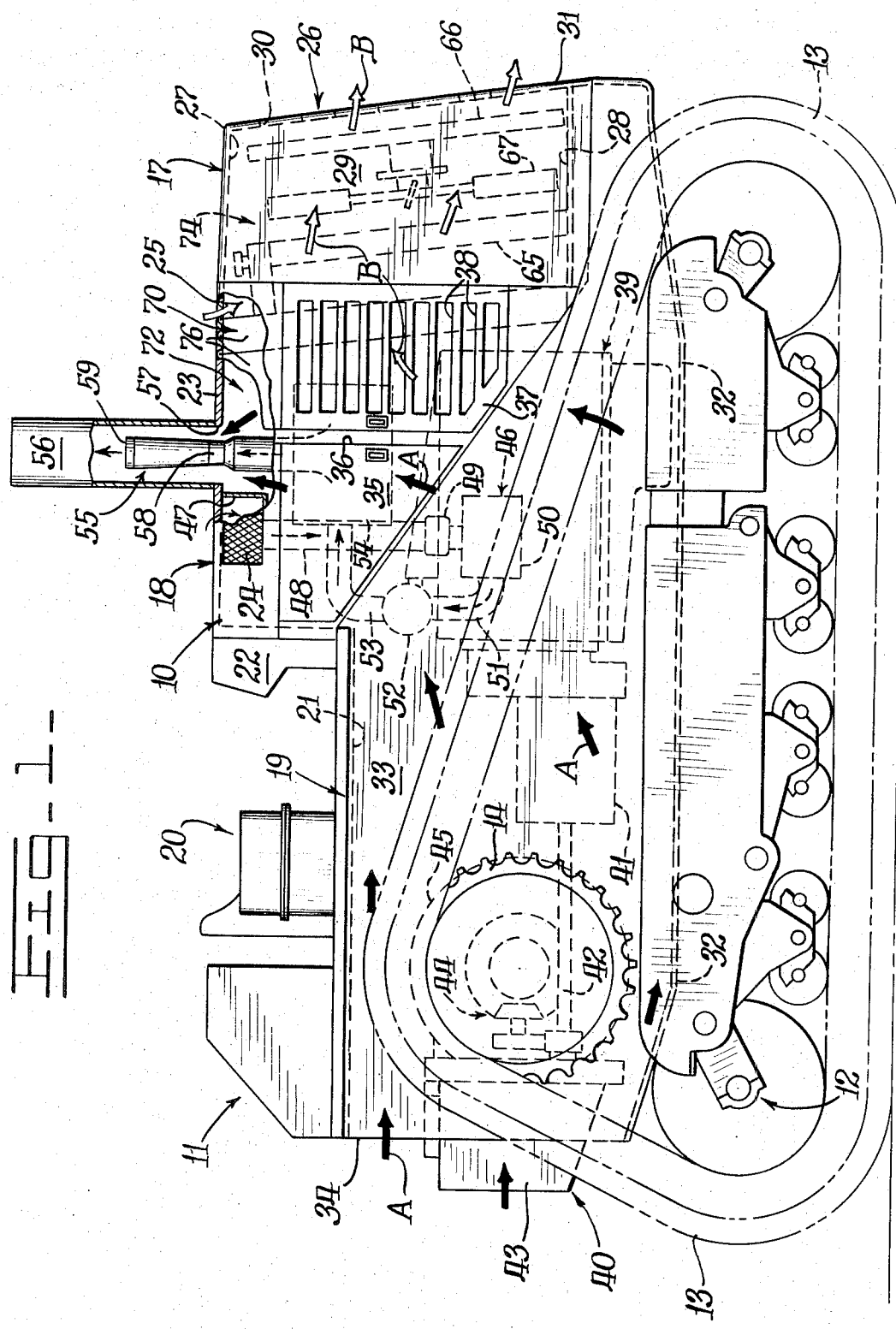
FIG. 1 is a side elevational view of a track-type vehicle incorporating the air-cooled enclosure of the present invention with portions broken away for illustrative convenience.
Figure 2:
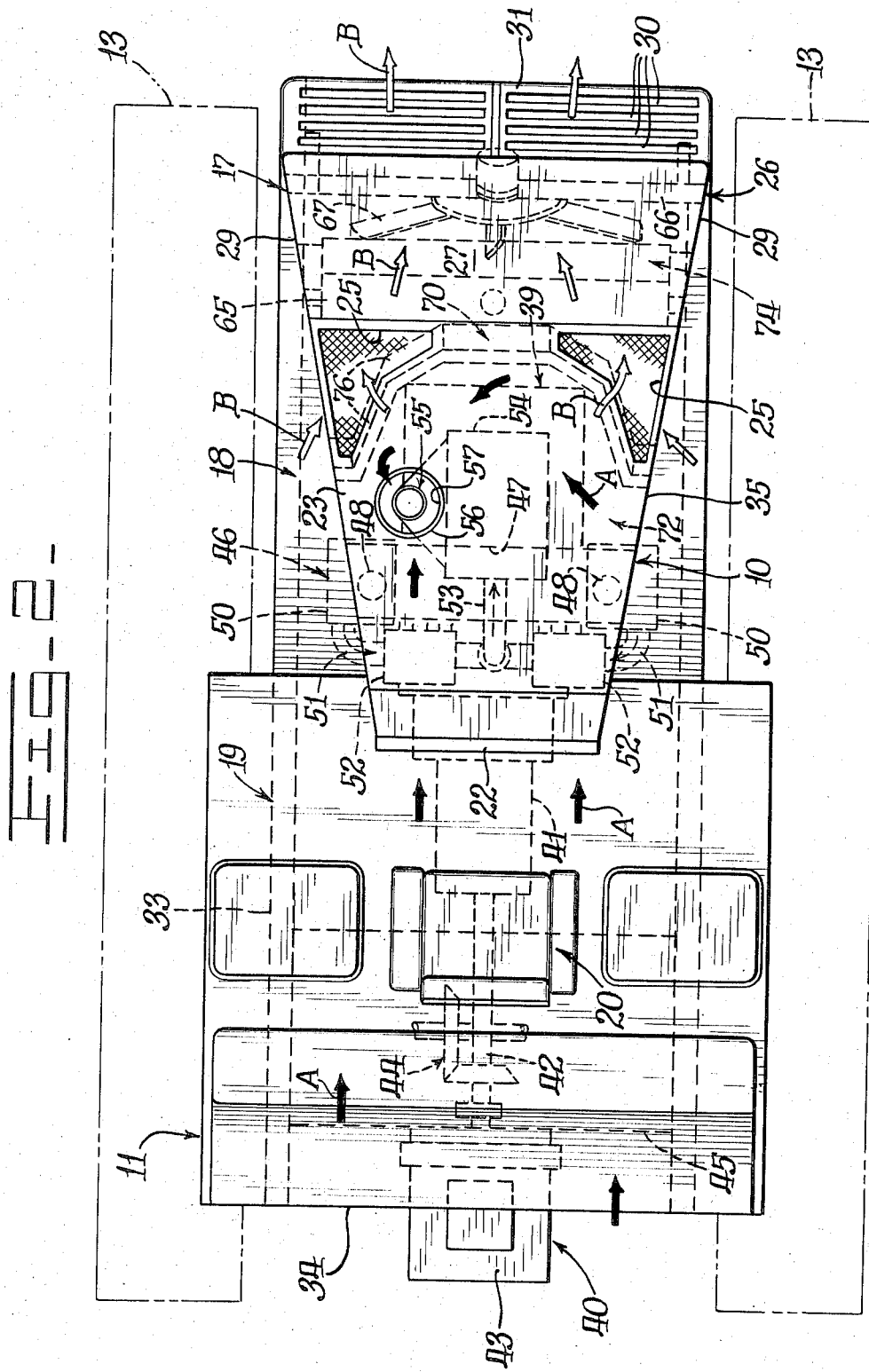
FIG. 2 is a top plan view of the vehicle and air-cooled enclosure of FIG. 1.

With reference to FIGS. 1 and 2 of the drawings, an air-cooled enclosure embodying the principles of the present invention is generally indicated by the reference numeral 10 and is shown adapted to a track-type vehicle or tractor 11. The tractor includes an undercarriage 12 for support thereof and is propelled by an endless track chain 13 powerably driven by a reversible driving sprocket 14 on each side of the tractor in the usual manner. The air-cooled enclosure 10 is transversely centrally disposed between the undercarriages 12 and track chains 13 and includes a forward portion 17, a central portion 18, and a rearward portion 19. An operator's station 20 is disposed immediately above the rearward portion 19 of the enclosure and forms therewith a ceiling 21. Forwardly of the operator station is a combined control console and fire wall 22 and adjacently disposed, forwardly extending tractor hood 23. The tractor hood includes a side mounted pair of screened engine air intake openings 24 and a forwardly disposed, top mounted pair of screened separate air inlet passages 25 therein.

Further forming a part of the air-cooled enclosure 10 at the forward portion 17 thereof is a radiator guard 26 having a ceiling 27, a floor 28, and sides 29, with one or more separate air outlet passages 30 in a forward wall 31 thereof. A separate floor and bottom guard 32 depends from the radiator guard 26 and extends rearwardly substantially throughout the full length of the enclosure. The air-cooled enclosure also includes a pair of rearwardly disposed sidewalls 33 generally extending between the ceiling 21 and floor 32 on opposite sides of the tractor 11 to define a relatively large, rearwardly opening air inlet passage 34. A pair of centrally disposed sidewalls 35 are contiguously associated with the sidewalls 33 forwardly thereof, and each sidewall 35 includes a solid access panel 36 and louvered access panel 37 therein for power plant servicing purposes. The louvered access panel provides a plurality of separate air inlet passages 38 therein which will be discussed later.

More particularly, the air-cooled enclosure 10 of the present invention contains a vehicle power plant or engine identified generally by the reference numeral 39. The engine propels the tractor 11 through a power train 40 including a torque converter 41, a drive line substantially reduce the transmission of engine noise outwardly from the enclosure 10.

The full benefits accruing from the primary ejector action at the air outlet passage 57 are obtained without the need for an additional powered fan or any moving parts, and are obtained at a minimum cost by utilizing the waste energy of the engine exhaust. It has been determined by actual tests that with an exhaust of 4,000 cubic feet per minute outwardly from the exhaust pipe 55, approximately 2,000 cubic feet per minute of ambient air is caused to circulate through the engine compartment for effective surface cooling of the engine and power train. Further, in the preferred embodiment of the present invention the tubular exhaust pipe 55 and throat 58 have a further venturi effect which serves to draw dust from the engine air precleaners 49 via the conduits 60, 61, and 62 and eject it outwardly of the tubular stack 56 with the engine exhaust gases to thus provide a secondary ejector function.

Figure 3:
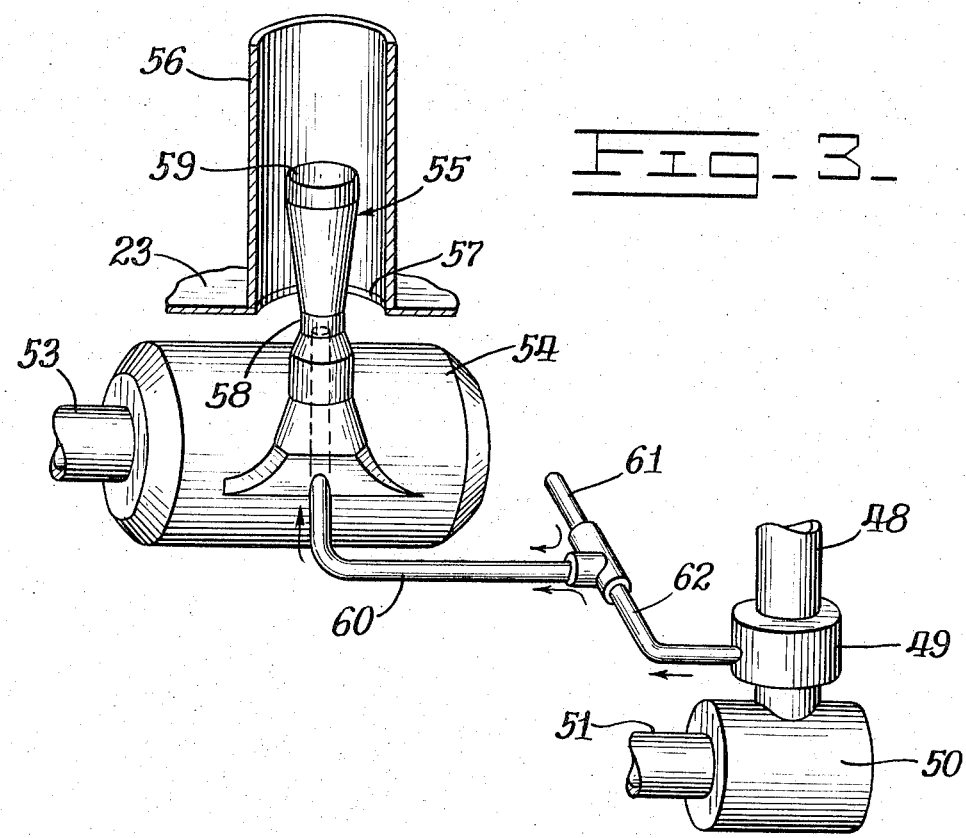
FIG. 3 is an enlarged fragmentary perspective view of the ejector portion of the air-cooled enclosure of the present invention.
Figure 4:
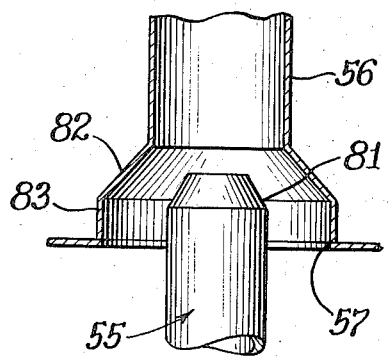
FIG. 4 is a somewhat enlarged fragmentary elevation and partial section of an alternate embodiment of the ejector portion of the air-cooled enclosure of the present invention.
Figure 5:
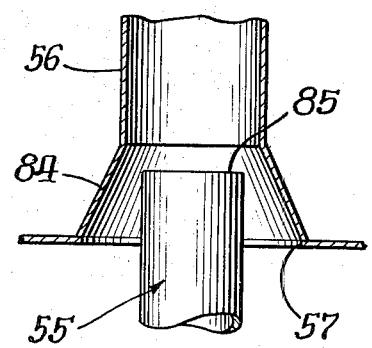
FIG. 5 is a view similar to FIG. 4 but showing another alternate embodiment of the ejector portion of the present invention.

The alternate and second alternate embodiments of the ejector portion of the present invention as shown in FIGS. 4 and 5 represent variations in the shapes of the tubular stack 56 and exhaust pipe 55 which exclude the secondary dust ejecting function while still incorporating the primary air cooling ejecting action. For this reason, the nozzle 81 in FIG. 4 is simpler in construction when compared to the preferred embodiment of FIG. 3 while increasing the velocity of the exhaust gases emanating from the exhaust pipe where necessary for improved ejecting action and drawing of cooling air through and outwardly from the compartment 72. Further, as shown in FIG. 5, an even more economical version can be adopted when the velocity of the exhaust gases emanating from the exhaust pipe is relatively high which includes a straight exhaust pipe 55 disposed within the frusto-conical converging entrance 84 to provide an ejector action which in many cases will still allow sufficient flow for effective engine compartment cooling.

In connection with the separate heat exchanger and fan compartment 74 on the front portion 17, it should be noted that the engine driven fan 67 is disposed between the first heat exchanger 65 and the second heat exchanger 66 in a manner that not only allows efficient air circulation forwardly therethrough, but also serves to muffle noise emanating from the fan. As the fan is operated, ambient cooling air as shown by the open arrows identified by the reference letter B is drawn inwardly through the separate air inlet passages 38 in the access panels 37 and through the separate air inlet passages 25 in the hood 23 to allow air flow inwardly and forwardly in a converging manner through the heat exchangers. Air is then forced forwardly and outwardly through the separate air outlet passages 30 in the guard 26 in a longitudinally forward manner directly away from the operator station 20. The sloping or inclined disposition of the inwardly converging panels 76 of the barrier wall 70 better allows flow of such ambient cooling air to the heat exchangers. The wall further completely divorces the flow of ambient cooling air through the engine compartment 72 from the flow of air through the separate heat exchanger and fan compartment 74.

In view of the foregoing, it is readily apparent that the structure of the present invention provides an improved air-cooled enclosure 10 which is capable of generating less noise with a minimum of power loss while providing a maximum of heat exchanger effectiveness. It accomplishes these objectives with only a single engine driven fan 67 which reduces the overall cost of the system and provides greater flexibility in the use of space within the enclosure 10.

Thus, while the invention has been described and shown with particular reference to the disclosed embodiments, it will be apparent that other variations might be possible that would fall within the scope of the present invention, which is not intended to be limited except as defined in the following claims.

What is claimed is:

1. An air-cooled enclosure system comprising;
   a frame;
   an engine supportably mounted on said frame having an exhaust pipe thereon;
   an engine heat exchanger through which a liquid circulates;
   outer wall means supported by said frame for generally containing said engine and said heat exchanger;
   internal wall means providing a substantially enclosed engine compartment within said outer wall means having air inlet means and air outlet means relatively remotely spaced from said air inlet means, said air outlet means disposed in operative association with said engine exhaust pipe;
   ejector means utilizing the flow of gases from said engine exhaust pipe for creating a relatively low pressure within said air outlet means from said engine compartment to draw ambient cooling air through said air inlet means into said engine compartment around said engine and out of said air outlet means; and
   a relatively open separate engine heat exchanger compartment within said outer wall means being separated from said engine compartment by said internal wall means and providing separate air inlet passage means and separate air outlet passage means for permitting the independent circulation of ambient cooling air into said separate air inlet passage means through said heat exchanger and out of said separate air outlet passage means with a minimum of noise transmission and optimum engine cooling effectiveness.

2. The air-cooled enclosure of claim 1 wherein said ejector means includes a generally tubular stack extending from said engine compartment in aligned relation with said air outlet means and said engine exhaust pipe extends partially concentrically into said tubular stack.

3. The air-cooled enclosure of claim 2 wherein said engine exhaust pipe has a constricted throat portion providing a venturi effect, and said engine includes engine air cleaner means with conduit means communicating with said throat portion effective to draw dust from said air cleaner means through said conduit means and eject it centrally outwardly of said exhaust pipe with the engine exhaust gases.

4. The air-cooled enclosure of claim 2 wherein said exhaust pipe has a nozzle on the extremity thereof in order to increase the velocity of the exhaust gases emanating therefrom for more effective operation of said ejector means.

5. The air-cooled enclosure of claim 2 wherein said tubular stack includes a converging entrance and said engine exhaust pipe terminates thereat in order to increase the flow of air through said engine compartment.

6. An air-cooled enclosure system for a vehicle comprising;
- a vehicle frame;
- an engine supported by said frame and having an engine exhaust pipe extended therefrom;
- an engine heat exchanger supported by said frame in relatively widely spaced relation to said engine;
- a powered fan supported by said frame adjacent said heat exchanger;
- an enclosure mounted on said frame in generally encircling relation to said engine and said heat exchanger;
- an operator station generally disposed above said enclosure;
- upright wall means dividing said enclosure into a substantially enclosed engine compartment having an air inlet and air outlet therethrough, and a relatively open separate engine heat exchanger and fan compartment having separate air inlet passage means and a separate air outlet passage, said powered fan drawing ambient cooling air through said separate air inlet passage means and forwardly and inwardly through said heat exchanger and out said separate air outlet passage away from said operator station thereby minimizing the noise and heat experienced at the operator station; and
- ejector means utilizing the flow of engine exhaust gases from said engine exhaust pipe for creating a relatively low pressure within said air outlet in order to independently draw ambient cooling air through said air inlet into said engine compartment and out said air outlet with optimum engine cooling effectiveness and a minimum of noise transmission.

7. The air-cooled enclosure of claim 6 wherein said air inlet is rearwardly disposed on said vehicle in relatively remotely spaced relation to said air outlet, said ejector means drawing ambient cooling air substantially through the length of said engine compartment from said air inlet to said air outlet, and said operator station being disposed on the enclosure so that the cooling air passes beneath said operator station for surface cooling thereof.

8. The air-cooled enclosure of claim 7 wherein said vehicle is a track-type tractor having a predetermined forward portion supporting said separate engine heat exchanger and fan compartment, and said separate engine heat exchanger and fan compartment includes a second heat exchanger to provide a pair of heat exchangers respectively disposed forwardly and rearwardly of said powered fan and serving to muffle noise emanating from said fan.

* * * * *

UNITED STATES PATENT OFFICE
CERTIFICATE OF CORRECTION

PATENT NO. : 3,866,580
DATED : February 18, 1975
INVENTOR(S) : Gerald E. Whitehurst, et al It is certified that error appears in the above-identified patent and that said Letters Patent are hereby corrected as shown below:

On the Title Page, Item [73], change the spelling of the assignee's corporate name from "Caterpillar Tractor Company" to --- Caterpillar Tractor Co.---.

Signed and Sealed this twenty-second Day of July 1975

[SEAL]

Attest:

RUTH C. MASON
*Attesting Officer*

C. MARSHALL DANN
*Commissioner of Patents and Trademarks*